United States Patent [19]

Hund et al.

[11] Patent Number: 5,902,455
[45] Date of Patent: May 11, 1999

[54] PROCESS FOR IMPROVING RETENTION IN A PROCESS FOR THE MANUFACTURE OF PAPER, BOARD AND THE LIKE, AND RETAINING AGENT FOR THE APPLICATION OF THIS PROCESS

[75] Inventors: René Hund, Villars; Christian Jehn-Rendu, Saint-Etienne, both of France

[73] Assignee: S.N.F., France

[21] Appl. No.: 08/849,167

[22] PCT Filed: Oct. 29, 1996

[86] PCT No.: PCT/FR96/01695

§ 371 Date: May 27, 1997

§ 102(e) Date: May 27, 1997

[87] PCT Pub. No.: WO97/16598

PCT Pub. Date: May 9, 1997

[30] Foreign Application Priority Data

Oct. 30, 1995 [FR] France .................................. 95 13051

[51] Int. Cl.$^6$ .................................................... D21H 21/10
[52] U.S. Cl. ..................... 162/164.1; 162/168.1; 162/168.2; 162/168.3; 162/181.8; 162/183
[58] Field of Search .............................. 162/164.1, 168.1, 162/168.2, 168.3, 181.8, 181.6, 183, 168.4

[56] References Cited

U.S. PATENT DOCUMENTS 4,913,775  4/1990  Langley et al. .
5,068,276  11/1991  Suitch et al. .

FOREIGN PATENT DOCUMENTS 0235893  9/1987  European Pat. Off. .
0348366  12/1989  European Pat. Off. .
0373306  6/1990  European Pat. Off. .
94/26972  11/1994  WIPO .

OTHER PUBLICATIONS

"Ash in Wood, Pulp, Paper and Paperboard: Combustion at 525° C., " Tappi, pp. 1–3, 1993.

*Primary Examiner*—Peter Chin
*Attorney, Agent, or Firm*—Parkhurst & Wendel, L.L.P.

[57] ABSTRACT

Process for improving retention during the manufacture of paper, board or the like, which consists:

first of all in adding to the fibrous suspension a first retaining agent formed by a cationic polymer of high molecular weight, then, optionally in shearing the flocs obtained, and finally, in adding to the suspension a second retaining agent of inorganic nature, characterized in that the second retaining agent is a kaolin pigment.

16 Claims, No Drawings

PROCESS FOR IMPROVING RETENTION IN A PROCESS FOR THE MANUFACTURE OF PAPER, BOARD AND THE LIKE, AND RETAINING AGENT FOR THE APPLICATION OF THIS PROCESS

TECHNICAL FIELD

The invention relates to a process for the manufacture of paper, board and the like; it also relates to a retaining agent for the application of this process.

The invention relates more particularly to a specific combination of retaining agents and of operating conditions promoting the retention of the fines and of the fillers when the sheet is being formed.

The process according to the invention and the compositions according to the invention additionally improve some properties of the paper itself, like the opacity in particular.

DISCUSSION OF PRIOR ART

When paper, board or the like is manufactured, it is well known to introduce into the cellulose pulp retaining agents whose function is to retain a maximum of fines and of fillers in the sheet. The beneficial effects that stem from the use of retaining agents are essentially:

increase in the output and reduction in the costs of manufacture: energy saving, steadier running of the machine, higher yield of fibers, fines, fillers and anionic processing products, lower acidity in the circuit, connected with a decrease in the use of aluminium sulphate and hence reduction in corrosion problems, and improvement in quality: better formation and look-through, improvement in the moisture content on sheet, in opacity, in smoothness, in absorbency and decrease in the porosity of the paper.

There are very many publications on this subject, as well as a certain number of products and processes employed in the industry. This is therefore a technical field which has formed the subject matter of numerous investigations, some parameters of which are well known but other parameters of which are less well known.

The invention relates to a system whose general concept is known, namely the addition to the cellulose paper pulp (containing the usual additives and prepared upstream in traditional manner) of a cationic polymer of high molecular weight, as first retaining agent, sometimes known in the literature as "main retaining agent", and then of a second retaining agent, sometimes known in the literature as "secondary retaining agent", which is microparticulate and essentially inorganic and anionic. Shearing of the pulp which is flocculated or being flocculated is next performed between the two points of addition, and the pulp thus treated is next brought to the flow box of the papermaking machine.

EP-A-0 348 366 thus describes an addition of an aluminum compound to the pulp, followed by a cationic polymer, followed by a polysilicic acid, itself characterized by a very high specific surface of at least 1050 m²/g. However, this last product is relatively costly.

EP-A-0 235 893 describes the use as first retaining agent of a cationic polymer of high molecular weight (a million and more), and then a shearing stage, then the addition of bentonite as second agent, a well-known disadvantage of which is that it presents environmental problems and, subsidiarily, that it risks affecting the brightness of the paper. According to this document the polymer is essentially linear. Microflocs are obtained after the shearing stage, and their cationicity is sufficient to interact with the bentonite. A considerable disadvantage of this technique is that it is tricky to apply. It involves, in fact, the use of an extremely fine powder which is difficult to disperse. Furthermore, the ability of bentonite to swell entails a serious risk of loss of control of the rise in viscosity, even with a risk of gelling. Example 4 of this document illustrates, furthermore, the extent to which the polymer/bentonite proportioning ratio is sensitive.

EP-B-0 373 306 recommends the addition of a cationic polymer of high molecular weight and of an association or combination of a microparticulate colloidal siliceous material (like bentonite or the like) with a water-soluble organic polymer of molecular weight lower than 100 000 and whose characteristic is based on a high anionic or cationic charge density of 4 to 24 meq/g. This polymer is used for the purpose of modifying the ionicity of the bentonite. The examples in this document are as a general rule with 10% by weight of polymer of low molecular weight in relation to the bentonite, such high contents being actually necessary to markedly modify the ionicity.

Furthermore, the phenomena related to retention have been of interest to many authors.

Thus T. G. Waech (Tappi Journal, March 1993) describes and recommends an addition sequence involving the retaining agent before the clay ("Kaolin WPSD clay") employed as filler. This document also describes the introduction of the retaining agent before the feed pump ("fan pump"), that is to say before a region of strong shearing, the clay being subsequently added as described in the abovementioned EP-A-0 235 893.

Other authors have studied the characteristic of the preferred point of introduction of the retaining agent, especially in relation to the shearing points that exist in the line. Some have recommended avoiding shearing the flocs, others have suggested flocculating before the shearing (theory of "tenacious" or "soft" flocs), others still have indicated that the best point of introduction needed to be determined by tests.

The following documents may be cited from the extensive literature which is available:

Sikora and Stratton, Tappi, November 1981, vol. 64, No. 11, who describe the shearing of the flocs and their reaggregation.

Luner, Tappi Journal, 1984 Papermakers Conference Atlanta, pp. 95–99, who describes the addition of cationic retaining polymer before the filler and confirms the reaggregation after shearing and the influence of many parameters on the opacity.

Tappi, vol. 56, No. 3, March 1973, p. 86 ("soft" flocs v. "hard" or "tenacious" flocs).

GB-A-1 265 496, which describes the introduction of the flocculent "at any point whatever which is efficacious for the retention".

U.S. Pat. No. 4,305,781, which associates a flocculating polymer and bentonite and recommends flocculating after the shearing stages.

"The use of water-soluble polymers as flocculants in papermaking", William A. Foster, Designed Product Dept., Dow Chemical, who indicates that flocs have different reactivities on shearing and that the practice consists in trying a number of points of addition.

U.S. Pat. No. 3,052,595, which indicates that two sequences are substantially equivalent, namely:
1) pulp/inorganic filler/bentonite (1–20%)/flocculant and
2) pulp/flocculating polymer/filler/bentonite with a preference, however, for sequence 1.

Alince and Lepoutre, Tappi Journal 1/83, who describe the inversion of the kaolin filler by a cationic polymer of low molecular weight, and, finally, Hubbe, Tappi Journal 1986, p. 116, who confirms that in most cases the point of addition is the result of a "compromise" the best of which is often "at the entry of the feed pump, despite the strong shearing".

The state of the art can therefore be summarized by indicating that it is known to employ so-called "dual" systems including a cationic first retaining agent, of high molecular weight, which must often be linear or substantially linear, next optionally to shear the flocs obtained, and then to add an inorganic microparticulate auxiliary second retaining agent which is characterized by a large specific surface (800 to 1000 m$^2$/g and more) and which consists especially of bentonite or modified bentonite (EP-B-0 235 893) or even a polysilicic acid (EP-A-0 348 366).

In WO-A-94 26972, to avoid the disadvantages, especially of dissolving retaining agents consisting of polymers of high molecular weight, it has been proposed to replace these polymers by the association of a homopolymer derived from N-vinylamide, of molecular weight of the order of ten thousand (10 000) and of inorganic microparticulate pigments such as silicas, alumina, titanium, kaolin, or bentonite, which is preferred. The inorganic pigment here behaves like a filler and does not act as a retaining agent for the fines or fillers in the sheet.

Naturally, it has also been well known for a good 10 or 20 years that bentonite and kaolin are two traditional additives which in an equivalent way necessarily come to mind to any person skilled in the art of the paper industry, as, furthermore, also do calcium carbonate, titanium dioxide and other traditional additives.

Despite this knowledge, however, no attempt has been made to employ a kaolin as second retaining agent.

In fact, a person skilled in the art is dissuaded from employing as inorganic retaining agents compounds which exhibit a low specific surface.

DESCRIPTION OF THE INVENTION

The invention relates to a process for improving retention during the manufacture of paper, board or the like, which consists:

first of all in adding to the fibrous suspension a first retaining agent formed by a cationic polymer of high molecular weight, then optionally in shearing the flocs obtained, and finally in adding to the suspension a second retaining agent of inorganic nature, characterized in that the second retaining agent is a kaolin pigment.

It is quite surprising that an inorganic product (kaolin) exhibiting a specific surface which is so low in relation to those known hitherto for this application (bentonite, silica) is able not only to fulfil efficiently this function of second agent for retaining the fines in the sheet, but also to avoid the secondary disadvantages of these products.

A person skilled in the art knows, in fact, that specific surface is an indication of the structure of the crystal and of its degree of agglomeration. Large specific surfaces are thus synonymous with a high power of particulate agglomeration and an increased availability for developing anionic or cationic sites, depending on the inorganic substance considered.

In other words, the invention consists, in the dual retaining systems including a cationic first polymer agent of high molecular weight and an anionic microparticulate second inorganic agent, in having selected a new inorganic retaining agent, namely kaolin, of specific surface from ten to a hundred times lower than that of the inorganic agents known hitherto for this function (bentonite, silica), whereas a person skilled in the art was dissuaded from employing such a compound exhibiting a specific surface which is so low. Furthermore and above all, it was unimaginable that this selection would not only make it possible successfully to fulfil the same functions, but would also make it possible, on the one hand, to avoid the abovementioned disadvantages of bentonite and, on the other hand, to reduce the capital cost of the plants.

It will be noted that other inorganic compounds of low specific surface, such as titanium oxide, calcium carbonate, precipitated or otherwise (comparable to that of kaolin in contrast to the very high specific surface of bentonite), which are also known as papermaking fillers, are incapable of fulfilling the same function as kaolin.

The kaolin can be chosen from commercialized products exhibiting a specific surface of between five and one hundred square metres per gram (5 and 100 m$^2$/g), preferably between ten and thirty square metres per gram (10 to 30 m$^2$/g), that is ten times lower than that of bentonite, and a hundred times lower than that of colloidal silica.

It has been found that no appreciable effects are obtained with a kaolin specific surface lower than 5 m$^2$/g.

On the other hand, there are no upper limits to the acceptable specific surface, other than that of the currently known pigments, that is to say in practice lower than one hundred square metres per gram.

The proportion of kaolin represents between 0.5% and 5%, preferably between 1 and 3%, by dry weight of kaolin relative to the dry weight of pulp. It has been observed that proportions of kaolin which are lower than 0.5% no longer give any appreciable effects and that beyond 5% there is no longer any proportional improvement.

The cationic polymer of high molecular weight (preferably corresponding to an i.v. of the order of $\geq 7$, advantageously $\geq 9$ or preferably $\geq 11$ dl/g) will be chosen from linear or branched homo- and copolymers containing up to approximately 30 or better 50–55 mol % of cationic units, of vinyl monomers optionally copolymerized with monomers of acrylamide (AM) or methacrylamide (MAM) type or chosen from the group including dimethylaminoethyl acrylate (DMAEA), dimethylaminoethyl methacrylate (DMAEMA), which are quarternized or salified, acrylamidopropyltrimethyl ammonium chloride (APTAC), dimethyldiallylammonium chloride (DADMAC) and methacrylamidopropyltrimethyl ammonium chloride (MAPTAC).

In an advantageous embodiment the kaolin is pretreated with a linear or branched, highly anionic vinylic acid polymer of molecular weight of between one hundred thousand (100,000) and four hundred thousand (400,000), preferably between 120 000 and 150 000. In fact, the molecular weight of the vinylic acid polymer must be sufficiently low not to flocculate the kaolin and sufficiently high not to produce a dispersive effect.

It is observed that there are redispersion problems with molecular weights lower than 100,000, whereas problems with kaolin flocculation appear with molecular weights higher than 400,000.

A person skilled in the art will be capable of choosing, using routine tests, a vinylic acid polymer of molecular weight capable of meeting the double criterion (of nonflocculation of the kaolin and absence of an appreciable dispersive effect) referred to above.

The following vinylic acid (co)polymers will be mentioned in particular:

homopolymers and copolymers of acrylic acid, of methacrylic acid and of acrylamidomethylpropyl sulphonic acid (AMPS), copolymers of the above monomers with an acrylamide or a methacrylamide.

The vinylic acid polymer is advantageously polyacrylic acid.

In the process according to the invention the proportion of polyacrylic acid is advantageously lower than one per cent (1%), preferably lower than zero point five per cent (0.5%), advantageously between zero point two (0.2) and zero point three per cent (0.3%) as dry weight of acid relative to the dry weight of kaolin.

It has been found that with proportions higher than 1%, there is a risk of redispersion and of reaction of the polyacrylic acid with the cationic polymer of high molecular weight (first retaining agent).

Furthermore, to increase the retention of fines and of fillers in the paper sheet, the pH of the pretreated kaolin must be between 3 and 7, preferably between 5 and 7. In fact, at a pH higher than 7 a risk of swelling of the kaolin was observed.

The preferred pretreatment of the kaolin is performed in the manner indicated in the preamble to the examples below.
Nonlimiting Example of Pretreatment of the Kaolin:

The kaolin suspension (known by the papermaking term of "slurry") in a concentration of 30% is prepared with an acrylic polymer of viscosity equal to 6500 cps at 15%, of 150,000 average molecular weight and of high anionicity.

The polyacrylic polymer may be either linear or branched and will have to be highly anionic, preferably 100% anionic.

From the solution of polymer in a concentration of 15% of active material 6.67 g are taken and are poured into a 100 ml graduated flask and made up to 100 ml with clear water. 9 ml of this solution are then taken and poured into 61 ml of clear water to obtain a volume of 70 ml.

It then suffices to stir and slowly to add the 30 g dry of kaolin of 13.5 m$^2$/g specific surface, with a whiteness (ISO) of 82.5 (to give an indication, the whiteness value of natural calcium carbonate varies from 82 to 86 for chalk), with a yellowness value of 6.5 and with respective L, a and b coordinates of 95, −0.3 and 5.5.

A kaolin slurry is then obtained with a viscosity of 42 cps, a viscosity which permits an easy application of the product, which is next diluted to the desired concentration and then injected as second retaining agent during the conversion to sheet.

In tables of results the proportion of the second retaining agent will be known as D2 and will be expressed as percentage by weight of dry kaolin relative to dry pulp.

The invention applies to the general processes of the prior art relating to paper manufacture. In particular, it will be quite advantageous to perform a shearing between the addition of the flocculating polymer and the addition of the second retaining system according to the invention.

Without wishing to be limited by a theory, applicants think that, in the alternative form of the invention comprising a pretreatment, the kaolin is activated in a very special manner by the combination a) of the anionic nature of the treatment polymer, b) by its molecular weight which, for a pretreatment agent, is relatively high, and c) by the proportion of pretreatment polymer which is, in contrast, relatively low.

Alince and Lepoutre have employed a cationic agent (PEI) in order probably to agglomerate the fillers before they come into contact with the pulp and thus somewhat to promote the interaction.

It is therefore all the more surprising that the invention can employ an anionic modifier.

Furthermore, the general state of the art led a person skilled in the art away from the use of kaolin as second retaining agent, for the reason indicated above and also because, for example, in Example 7 of EP-A-0 235 893, it is indicated that kaolin does not produce good results when compared directly with bentonite.

The invention results in the following advantages.

The main advantage relates to the retention of the fillers and of the fines, as the examples hereinafter will demonstrate.

A second advantage is that of reducing the porosity of the paper obtained.

A third advantage lies in the deconcentration or clarification of the white waters.

It will also be noted that the use of kaolin of whiteness close to that of natural CaCO$_3$ does not in any way affect the brightness characteristics of the sheet obtained.

In addition, the opacity of the paper obtained is better.

Finally, by succeeding in employing kaolin against all expectation, provided that a specific pretreatment is performed, the invention avoids the additional disadvantage of the use of bentonite, which is that it gives rise to a risk of gelling and very subsidiarily to risks affecting the brightness of the paper, even in low proportions.

Procedure for Preparing the Tests:

The high-consistency pulp employed for the preparation of the dilute pulp can be prepared from conventional pulps such as chemical pulps containing sulphate or sulphite of coniferous or deciduous wood, or else mechanical, thermo-mechanical or chemithermo mechanical pulps, bleached or otherwise, or else recycled fiber heads.

The high-consistency pulp and the paper formed may be unfilled or filled with substances employed conventionally by paper manufacturers, like calcium carbonate, precipitated calcium carbonate, clays, titanium dioxide or else talc. This filler, which is mainly employed in the manufacture of writing printing paper will be preferably added during the preparation of the high-consistency pulp in proportions ranging from 5 to 50% at most of fillers relative to the dry weight of pulp.

The pulp may contain other additives such as sizing agents, in neutral and alkaline medium of the sizes of alkyl ketene dimer type and the pH may vary from 4 to 9 according to the type of filler employed. In general, the low-consistency pulp will have a fiber content ranging from 0.3 to 3% and a solids content from 0.3 to 1.5%.

Manner of Carrying Out the Invention:

Preparation of the high-consistency pulp

A quantity of dry pulp of known dry content and freeness value is taken. This pulp is placed in the disintegrator of Mark DIII type and then an appropriate volume of water and the inorganic filler are added from a dispersion known in the trade by the name of "slurry", of known concentration, to bring the whole to a disintegration consistency. A high-consistency pulp is then obtained.

At the end of disintegration the consistency is measured according to the TAPPI standard T 240-om-93.

The quantity of high-consistency pulp which is necessary to produce a sheet with the desired substance is then taken, and is placed in a beaker so as to constitute the pulp before its stage of dilution and of conversion to sheet.

Preparation of the dilute pulp

The thick (or high-consistency) pulp is next diluted to obtain a low-consistency pulp which has a fiber content of between 0.3 and 3% and a solids content of between 0.3 and 1.5%.

Conversion to sheet

A sheet is produced on a so-called CTP automated retention former marketed by Techpap. This apparatus makes it possible to produce sheets while controlling parameters such as shearing or the partial vacuum under wire, to simulate, on the one hand, the shearing of the primary circuit and its pumps, as well as the fourdrinier and its suction doctors. This thus makes it possible to have a very high correlation between this wholly automated former and a papermaking machine.

White water recycling is carried out with a view to simulating the recirculation of the waters under wire. The waters are generally recovered and then remixed with high-consistency pulp. To begin with, a first beaker of pulp is diluted with clear waters to bring it to a low consistency (generally of 0.7%) and then the whole is poured into the mixing cylinder of the former.

It then suffices to start up the automatic device whose parameters are given below. The sheet F1 is then produced, which corresponds to the first run. At this time the white waters of turbidity referred to hereinafter as T1 and expressed in NTU units are recovered and the total retention under wire of the first run, denoted hereinafter in % (RF1), is performed. Finally, the retention of inorganic fillers, denoted hereinafter in % (RC1), is measured using the ash of this sheet.

The high-consistency pulp is diluted again with the white waters from the first run, to produce a second sheet F2, which is kept to have an idea of the formation, and finally a third sheet F3, which is analysed like the first.

The automatic retention former parameters which have been set for the tests are the following:

t1: 75 seconds' stirring made up of a stage of 60 seconds at 1500 revolutions per minute (rev/min) and then a second stage of 15 seconds at 1000 rev/min.

t2: 3 seconds' opening of the conical valve for pouring the pulp.

t3: 0.6 seconds' bubbling of air above the grid, to prevent its blocking.

t4: 10 seconds' sheet formation.

t5: 15 seconds' recovery of the white waters in the tank.

It is quite advantageous to perform a shearing between the addition of the flocculating polymer and the addition of the second retaining system according to the invention.

The first retaining agent is added at the end of ten seconds after the beginning of t1 and with stirring at 1500 rev/min; on the other hand, the second retaining agent is added at the end of stage t1, that is to say at the beginning of the stirring at 1000 rev/min.

Diagram Describing the Operations in Time:

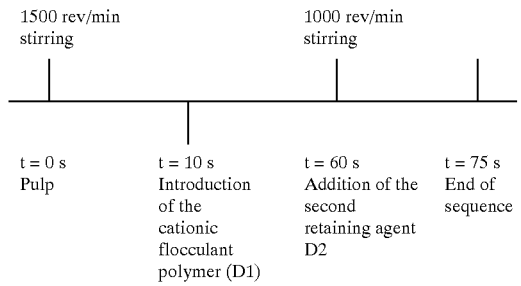

The retention calculations are the following:

R denotes the total retention percentage calculated by the formula:

$$R = Wo/(Wo+W1) \times 100$$

with:
Wo: Weight of the dry sheet.
W1: Dry weight of the suspended matter present in the white waters.

FR denotes the percentage retention of the fillers, calculated by the formula:

$$FR = (AW/Wo)/F \times 100$$

with:
AW: Weight of ash after pyrolysis of the sheet at 460° C.
Wo: Weight of the dry sheet.
F: Percentage of the fillers introduced initially.

The total matter in suspension is determined according to TAPPI method T656 cm/83.

The ash is determined according to the TAPPI method T211 om-93.

The freeness value is determined according to the TAPPI method T227 om-94.

The Compounds Used:

First retaining agent (D1)

A copolymer of acrylamide and trimethylammonium ethyl acrylate chloride is used, with an intrinsic viscosity of 9.5 dl/g and with a cationic filler equal to 10 mol %, marketed under the designation FO 4190.

In the tests, the added quantity of the first retaining agent is denoted by D1 and expressed as a percentage by weight of dry material relative to the dry pulp.

Second retaining agent (D2)

As already indicated, the second retaining agent (D2) is, according to the concept of the invention, a kaolin pigment and, according to alternative form of the invention, a kaolin pretreated with an anionic polymer. These two options are exemplified in the tables below.

A.—When the kaolin pigment is not pretreated, 30 g of kaolin are taken and suspended in 70 ml of water. A concentrated suspension at a concentration of 30 mass % is obtained which is next employed at the dilution ratio desired for the injection.

The examples without pretreatment are marked with a "*".

B.—When pretreated kaolin is employed, a solution of polymer containing 15% of an acrylic acid polymer with a viscosity equal to 6500 cps, with an average molecular weight of 150,000 and with high anionicity is prepared initially. To this solution of acrylic polymers are then added gently, with stirring, 30 g dry of kaolin with a specific surface of 13.5 $m^2/g$, with whiteness (ISO) of 82.5 (to give an indication, the whiteness value of natural calcium carbonate varies from 82 to 86 for chalk), with a yellowness value of 6.5 and with respective L, a* and b* coordinates of 95, −0.3 and 5.5.

A kaolin suspension is then obtained which has a viscosity of 42 cps, which allows the product to be easily used. The suspension is next diluted to the desired concentration and then injected as secondary retaining agent during the conversion to sheet.

In the tables, the added quantity of the second retaining agent is denoted by D2 and is expressed as a percentage by weight of dry kaolin relative to the dry pulp.

EXAMPLES 1 to 5

In these examples a comparison is made in an alkaline medium of various modified inorganic substances with a low specific surface and in common use which are employed as fillers in the manufacture of paper.

A series of tests is thus performed in alkaline medium on a pulp which has the following composition (by weight):

10% of bleached coniferous kraft
70% of bleached deciduous kraft
20% of pine mechanical pulp
25% of calcium carbonate
1.0% of a size known as AKD.

This pulp has a pH of 8.5 and a CSF freeness value of 365 ml.

The following are employed respectively as second retaining agents:

E: titanium dioxide (Sp*:12 $m^2/g$) pretreated with 0.3% of polyacrylic acid

F: precipitated calcium carbonate (Sp*:14.5 $m^2/g$) pretreated with the same quantity of polyacrylic acid G: calcium carbonate (Sp*:11 $m^2/g$) pretreated with 0.3% of polyacrylic acid H: kaolin(Sp*:13.5 $m^2/g$) pretreated with 0.3% of polyacrylic acid, the pH of the preparation being equal to 3.8.

The specific surface Sp* is measured by the BET method.

The sheet is produced with a consistency of 0.7% and the theoretical substance is 134 g/m².

The results obtained are collated in Table 1 below.

| Ex | D1 | D2 | T1 | T2 | T3 | R1 | R3 | FR1 | FR2 | CSF |
|---|---|---|---|---|---|---|---|---|---|---|
| 1 | 0.05 | 0.0 | 1350 | 1996 | 1980 | 89.8 | 87.1 | 58.8 | 75.2 | 470 |
| 2 | 0.05 | 3.0E | 1560 | 2268 | 2500 | 85.2 | 82.0 | 61.0 | 74.1 | 425 |
| 3 | 0.05 | 3.0F | 1209 | 2140 | 2380 | 85.4 | 83.5 | 57.3 | 72.0 | 410 |
| 4 | 0.05 | 3.0G | 1374 | 1910 | 2078 | 87.0 | 84.1 | 61.3 | 72.8 | 432 |
| 5 | 0.05 | 3.0H | 431 | 523 | 618 | 92.8 | 89.9 | 68.2 | 79.9 | 575 |

Example 5 corresponds to the invention.

This Table 1 reveals the major advantage of the use of the second retaining agent recommended by the invention, that is to say kaolin. In fact, the use of the other most common inorganic fillers which have a specific surface close to that of kaolin, that is to say of the order of 10 to 15 m²/g, as against 100 m²/g and more in the case of bentonite, is of no advantage in relation to the improvement of the turbidities of the white waters, the total retentions and fillers.

These results confirm the abovementioned analysis of Example 7 of EP-A-0 235 893 for all the fillers other than kaolin and in the proportions recommended according to the present invention.

In fact, kaolin (Example 5) allows the value of the turbidity (T1, T2 and T3) in the white waters to be reduced threefold and more. A marked improvement is also observed in the total retention by 5 to 7%, and a retention of the fillers by 5 to 10 points.

In other words, the manufacturing margins are correspondingly improved while the qualities of the paper (brightness, gloss, opacity, etc.) see a corresponding improvement.

EXAMPLES 6 to 19

In these examples a series of tests is performed in neutral medium, employing different percentages of secondary retaining agent in a pulp which has the following composition (by weight):

50% of bleached coniferous kraft
50% of bleached deciduous kraft
20% of calcium carbonate
1.0% of a size known as AKD (alkenyl ketene dimer).

This pulp has a pH of 7.5 and a CSF freeness value of 270 ml. Various percentages of kaolin are employed as second retaining agent. The kaolin without polyacrylic agent is denoted by "*".

The pH of the pretreated kaolin is equal to 3.8.

The sheet is produced with a consistency of 0.7% and the theoretical substance is 128 g/m².

The results obtained are collated in Table 2 below.

| Ex | D1 | D2 | T1 | T2 | T3 | R1 | R3 | FR1 | FR2 | CSF |
|---|---|---|---|---|---|---|---|---|---|---|
| 6 | 0.00 | 0.0 | 3630 | 3283 | 3196 | 69.1 | 71.3 | 9.5 | 10.0 | 270 |
| 7 | 0.01 | 0.0 | 2850 | 3010 | 3020 | 80.5 | 79.4 | 45.0 | 59.0 | 324 |
| 8 | 0.05 | 0.0 | 1080 | 1315 | 1310 | 91.6 | 90.2 | 57.2 | 75.0 | 344 |
| 9 | 0.10 | 0.0 | 540 | 670 | 990 | 94.0 | 93.8 | 71.0 | 78.9 | 374 |
| 10 | 0.01 | 0.2 | 2800 | 2950 | 3002 | 81.1 | 82.2 | 46.0 | 58.0 | 323 |
| 11 | 0.05 | 0.2 | 1005 | 1210 | 1280 | 91.7 | 91.0 | 61.0 | 77.0 | 345 |
| 12 | 0.10 | 0.2 | 520 | 655 | 940 | 93.9 | 92.1 | 70.4 | 77.2 | 382 |
| 13 | 0.01 | 1.0 | 2730 | 2892 | 2940 | 83.5 | 84.0 | 49.0 | 57.5 | 342 |
| 14 | 0.05 | 1.0 | 1009 | 1102 | 1213 | 92.0 | 91.5 | 60.2 | 78.2 | 351 |
| 15 | 0.10 | 1.0 | 495 | 603 | 910 | 94.4 | 94.5 | 71.9 | 79.4 | 385 |
| 16 | 0.01 | 3.0 | 2644 | 2812 | 2903 | 83.4 | 83.8 | 51.0 | 62.1 | 339 |
| 17 | 0.05 | 3.0 | 405 | 410 | 415 | 94.8 | 95.1 | 69.2 | 78.0 | 451 |
| 18 | 0.10 | 3.0 | 116 | 126 | 132 | 97.4 | 97.8 | 84.9 | 82.8 | 489 |
| 19* | 0.05 | 3.0* | 916 | 925 | 930 | 91.2 | 91.5 | 68.3 | 77.2 | 430 |

In the case of a minimum added quantity of one percent (1%) of second retaining agent recommended by the invention, that is to say kaolin, an improvement is noted in the turbidities (T1, T2, T3) and the total retentions (R1 and R3) when compared with the first retaining agent employed alone.

The advantages linked with the addition of the second retaining agent when compared with a single-mode retaining system are particularly well illustrated by Example 8 (single-mode system) and Example 17 (dual system of the invention).

Thus, in Example 17 the addition of three per cent (3%) of second retaining agent allows the turbidity from the first run to be reduced by 62.5% by comparison with that of the first retaining agent employed alone (Example 8), but also allows the turbidity of the first and of the second recirculation to be reduced by 69% (Example 8).

The second retaining agent employed in Example 17 makes it possible, on the one hand, to increase by 21% the retention of fillers from the first run (Example 8), and on the other hand, to increase by 31% the freeness of the pulp (Example 8).

The use of coreactants in Example 17 in comparison with Example 19* permits a marked improvement (of the order of 125%) in the turbidities and a slight improvement in the total retention.

EXAMPLES 20 to 33

In these examples, a series of tests is performed in alkaline medium, employing different percentages of second retaining agent on a pulp which has the following composition (by weight):

10% of bleached coniferous kraft

70% of bleached deciduous kraft

25% of calcium carbonate

1% of size known as AKD

20% of pine mechanical pulp.

This pulp has a pH of 8.5 and a CSF freeness value of 365 ml.

Various percentages of kaolin are employed as second retaining agent. The kaolin without polyacrylic agent is denoted by "*".

The pH of the pretreated kaolin is equal to 3.8.

The sheet is produced with a consistency of 0.7% and the theoretical substance is 134 g/m$^2$.

The results obtained are collated in Table 3 below:

| Ex | D1 | D2 | T1 | T2 | T3 | R1 | R3 | FR1 | FR2 | CSF |
|---|---|---|---|---|---|---|---|---|---|---|
| 20 | 0.00 | 0.0 | >4000 | >4000 | >4000 | 82.1 | 76.0 | 56.7 | 57.9 | 365 |
| 21 | 0.01 | 0.0 | >4000 | >4000 | >4000 | 83.6 | 78.2 | 57.0 | 61.3 | 410 |
| 22 | 0.05 | 0.0 | 1350 | 1996 | 1980 | 89.8 | 87.1 | 58.8 | 75.2 | 470 |
| 23 | 0.10 | 0.0 | 490 | 594 | 705 | 94.2 | 94.0 | 60.0 | 92.5 | 560 |
| 24 | 0.01 | 0.2 | >4000 | >4000 | >4000 | 84.2 | 79.0 | 58.3 | 62.1 | 415 |
| 25 | 0.05 | 0.2 | 1294 | 1725 | 1668 | 90.4 | 87.8 | 59.7 | 76.0 | 490 |
| 26 | 0.10 | 0.2 | 466 | 571 | 665 | 95.3 | 94.3 | 61.4 | 93.2 | 565 |
| 27 | 0.01 | 1.0 | >4000 | >4000 | >4000 | 86.4 | 81.2 | 63.0 | 65.3 | 435 |
| 28 | 0.05 | 1.0 | 1110 | 1620 | 1570 | 92.3 | 90.8 | 65.0 | 79.0 | 530 |
| 29 | 0.10 | 1.0 | 385 | 402 | 410 | 96.2 | 95.1 | 67.6 | 96.0 | 575 |
| 30 | 0.01 | 3.0 | 3557 | 3640 | 3710 | 87.2 | 81.0 | 65.1 | 66.0 | 440 |
| 31 | 0.05 | 3.0 | 431 | 523 | 618 | 92.8 | 89.9 | 68.2 | 79.9 | 540 |
| 32 | 0.10 | 3.0 | 152 | 138 | 146 | 97.2 | 96.4 | 72.2. | 96.6 | 575 |
| 33* | 0.05 | 3.0* | 685 | 712 | 741 | 90.2 | 86.3 | 67.6 | 75.4 | 520 |

Table 3 reveals the major advantage of the addition of the second retaining agent recommended by invention, that is to say kaolin.

EXAMPLES 34 to 47

In these examples a series of formers is prepared in acidic medium, using kaolin as main filler, from a pulp which has the following composition:

25% of bleached coniferous kraft

75% of bleached deciduous kraft

15% of solid kaolin.

This pulp has a pH of 5.5 and a CSF freeness value of 265 ml.

Various percentages of kaolin are employed as second retaining agent. The kaolin without polyacrylic agent is denoted by "*".

The pH of the pretreated kaolin is equal to 3.8.

The sheet is produced with a consistency of 0.7% and the theoretical substance is 123 g/m$^2$.

The results obtained are collated in Table 4 below.

| Ex | D1 | D2 | T1 | T2 | T3 | R1 | R3 | FR1 | FR2 | CSF |
|---|---|---|---|---|---|---|---|---|---|---|
| 34 | 0.00 | 0.0 | >4000 | >4000 | >4000 | 86.7 | 84.6 | 33.0 | 29.7 | 265 |
| 35 | 0.01 | 0.0 | 3712 | 3810 | 3860 | 90.7 | 88.2 | 59.7 | 60.2 | 324 |
| 36 | 0.05 | 0.0 | 1325 | 1417 | 1495 | 93.3 | 89.0 | 88.3 | 89.5 | 389 |
| 37 | 0.10 | 0.0 | 544 | 583 | 609 | 95.2 | 93.0 | 96.0 | 95.1 | 440 |
| 38 | 0.01 | 0.2 | 3607 | 3815 | 3882 | 90.7 | 88.0 | 61.8 | 62.7 | 334 |
| 39 | 0.05 | 0.2 | 1301 | 1419 | 1483 | 93.1 | 89.1 | 89.4 | 90.6 | 388 |
| 40 | 0.10 | 0.2 | 531 | 577 | 594 | 95.4 | 92.8 | 96.1 | 95.5 | 449 |
| 41 | 0.01 | 1.0 | 3402 | 3524 | 3535 | 90.8 | 87.4 | 64.0 | 66.7 | 335 |
| 42 | 0.05 | 1.0 | 1014 | 1112 | 1110 | 93.4 | 90.5 | 91.2 | 92.8 | 391 |
| 43 | 0.10 | 1.0 | 470 | 485 | 492 | 95.8 | 93.0 | 97.0 | 96.5 | 451 |
| 44 | 0.01 | 3.0 | 2950 | 3022 | 3125 | 91.6 | 90.0 | 68.1 | 69.9 | 348 |
| 45 | 0.05 | 3.0 | 510 | 514 | 519 | 94.0 | 93.7 | 94.0 | 93.0 | 428 |
| 46 | 0.10 | 3.0 | 315 | 295 | 284 | 96.6 | 95.8 | 98.1 | 98.2 | 446 |
| 47* | 0.05 | 3.0* | 495 | 503 | 510 | 93.9 | 93.2 | 94.2 | 93.1 | 435 |

This table reveals the advantages of the dual system with kaolin, this being regardless of the added quantity of the first retaining agent.

On the other hand, the use of polyacrylic acid (cf. comparison of Examples 45 and 47) produces only a slight improvement.

EXAMPLES 48 to 52

In these examples the dual system recommended by the invention is compared with other particulate systems existing on the market, employing inorganics whose specific surface is very high.

These particulate systems are the following:

the Hydrocol (TM) system (EP-A-0 235 893) combining a substantially linear polyacrylamide of high molecular weight with an activated bentonite;

the Composil (TM) system (EP-A-0 348 366) associating a cationic polyacrylamide of high molecular weight with a colloidal silica of high specific surface (BMA O);

the system developed in EP-A-0 373 306, combining a hectorite dispersed using a polyacrylate of very low molecular weight (preferably lower than 100 000).

In these examples a pulp which has the following composition is employed:

50% of bleached coniferous kraft
50% of bleached deciduous kraft
20% of calcium carbonate
1% of size known as AKD.

This pulp has a pH of 7.5 and a CSF freeness value of 270 ml.

The following are employed respectively as second retaining agent:

A: sodium-type bentonite with high swellability
B: colloidal silica of BMA O type marketed by Eka Nobel in the Composil range
C: hectorite dispersed with five per cent (5%) of a standard polyacrylic (molecular weight of 5000)
D: second retaining agent recommended by the invention in which the pH of the pretreated kaolin is equal to 3.8.

The sheet is produced with a consistency of 0.7% and the theoretical substance is 128 g/m².

The results obtained are collated in Table 5 below.

| Ex | D1 | D2 | T1 | T2 | T3 | R1 | R3 | FR1 | FR2 | CSF |
|----|------|------|-----|------|------|------|------|------|------|-----|
| 48 | 0.10 | 0.0  | 540 | 670  | 990  | 94   | 93.8 | 71.2 | 76.8 | 374 |
| 49 | 0.10 | 0.2A | 95  | 128  | 156  | 98.5 | 97.2 | 78.3 | 80.9 | 652 |
| 50 | 0.10 | 0.2B | 160 | 265  | 318  | 96.3 | 95.8 | 71.8 | 77.7 | 510 |
| 51 | 0.10 | 0.2C | 206 | 1013 | 2019 | 95.5 | 92.6 | 78.4 | 71.7 | 451 |
| 52 | 0.10 | 3.0D | 116 | 126  | 132  | 97.4 | 97.8 | 89.8 | 94.2 | 505 |

Where the turbidity is concerned, the systems of Examples 49 to 52 are greatly superior to the other systems, the system of Example 52 recommended by the inventor nevertheless exhibiting an advantage when the white waters are recycled.

Furthermore, a dispersive effect of the colloids system described in EP-A-0 373 306 is noted.

Where the retention of the fillers is concerned, the system recommended by the invention makes it possible to obtain filler retentions which are very superior to those of the other existing systems.

Where the total retention is concerned, the systems of Examples 49 to 52 produce closely related results.

Where the formation is concerned, the system of Example 49 develops a poor formation when compared with the other examples.

EXAMPLES 53 and 54

In these examples a series of tests in which the pH of the pretreated kaolin is varied is performed in alkaline medium on a pulp of composition identical with that of the preceding Example 31.

| Ex | D1 | D2 | T1 | T2 | T3 | R1 | R3 | FR1 | FR2 | pH |
|----|------|---|-----|-----|-----|--------|--------|--------|--------|-----|
| 31 | 0.05 | 3 | 431 | 523 | 618 | 92.80% | 89.90% | 68.20% | 79.90% | 3.8 |
| 53 | 0.05 | 3 | 334 | 448 | 469 | 97.18% | 96.54% | 84.33% | 88.60% | 5.5 |
| 54 | 0.05 | 3 | 250 | 397 | 470 | 97.41% | 96.65% | 87.46% | 86.13% | 7.0 |

When the pH of the pretreated kaolin is varied, an improvement is noted in the turbidity of the white waters, as is a gain of 4% in 1st run retention R1 and a gain of 7% in 3rd run retention R3. In the case of the retention of the inorganic fillers, a gain of 23% is observed in 1st run filler retention FR1 and 11% in 3rd run filler retention FR3 is observed.

EXAMPLES 55 and 56

In these examples a series of tests in which the pH of the pretreated kaolin is varied is carried out in acidic medium on a pulp of composition identical with that of the preceding Example 45.

| Ex | D1 | D2 | T1 | T2 | T3 | R1 | R3 | FR1 | FR2 | pH |
|----|------|----|-----|-----|-----|--------|--------|--------|--------|-----|
| 45 | 0.05 | 3 | 510 | 514 | 519 | 94.00% | 93.70% | 94.00% | 93.00% | 3.8 |
| 55 | 0.05 | 3 | 293 | 409 | 417 | 96.65% | 96.03% | 95.94% | 93.15% | 5.5 |
| 56 | 0.05 | 3 | 250 | 397 | 470 | 96.53% | 96.21% | 94.82% | 90.64% | 7.0 |

The same general influence of the pH as in alkaline medium is noted in acidic medium.

EXAMPLES 57 and 58

In these examples a series of tests in which the pH of the pretreated kaolin is varied is performed in neutral medium on a pulp of composition identical with that of the preceding Example 17.

| Ex | D1 | D2 | T1 | T2 | T3 | R1 | R3 | FR1 | FR2 | pH |
|----|------|----|-----|-----|------|--------|--------|--------|--------|-----|
| 17 | 0.05 | 3 | 405 | 410 | 415  | 94.80% | 95.10% | 69.20% | 78.00% | 3.8 |
| 57 | 0.05 | 3 | 789 | 878 | 1083 | 95.67% | 95.68% | 77.83% | 81.08% | 5.5 |
| 58 | 0.05 | 3 | 621 | 932 | 1036 | 96.57% | 95.62% | 80.15% | 84.83% | 7.0 |

In neutral medium the same influence is again found with regard to the total retention and, more particularly, a gain in filler retention of 15% in FR1 and of 8.7% in FR3 is found.

In view of the indisputable improvement in the retention, the change in the turbidity appears paradoxical.

Examples 53 to 58 show, therefore, that the pH at which kaolin is pretreated is an important parameter in the context of this dual system. The optimum pH range of this system lies between 5.0 and 7.0. In fact, it is in this weakly acidic pH range that the best values of total retention and of filler retention have been obtained.

We claim:

1. A process for improving retention during the manufacture of paper or paper board from a fibrous suspension of cellulose paper pulp, said process consisting of:
   initially adding to said fibrous suspension a cationic polymer of high molecular weight and an intrinsic viscosity of at least 7 dl/q to function as a first retention agent in an amount sufficient to form flocs,
   optionally shearing the flocs obtained to control floc size,
   and lastly adding to the suspension a kaolin pigment to act as a second retention agent, wherein the concentration of kaolin in relation to the dry weight of the pulp is between 0.5 and 5%, to form paper or paper board.

2. The process of claim 1, wherein the concentration of kaolin relation to the dry weight of the pulp is between 1 and 3%.

3. The process of claim 1, wherein said kaolin has a specific surface of between 5 and 100 m$^2$/g.

4. The process of claim 3, wherein said kaolin has a specific surface of between 10 and 30 m$^2$/g.

5. The process of claim 1, wherein said kaolin is pretreated with a linear or branched, highly anionic vinylic acid polymer of molecular weight of between 100,000 and 400,000.

6. The process of claim 5, wherein said vinylic acid polymer has a molecular weight of between 120,000 and 150,000.

7. The process of claim 5, wherein the vinylic acid polymer is polyacrylic acid and is present in an amount less than 1% by dry weight of acid relative to the dry weight of kaolin.

8. The process of claim 7, wherein said proportion of polyacrylic acid is present in an amount less than 0.5% by dry weight of acid relative to the dry weight of kaolin.

9. The process of claim 8, wherein said proportion of polyacrylic acid is present in an amount between 0.2 and 0.3% by dry weight of acid relative to the dry weight of kaolin.

10. The process of claim 5, wherein said anionic vinylic acid polymer is selected from the group consisting of the homopolymers and copolymers of acrylic acid, of methacrylic acid and of acrylamidomethyl-propylsulphonic acid (AMPS); and copolymers of the above monomers with an acrylamide or methacrylamide.

11. The process of claim 5, wherein the pH of the pretreated kaolin is between 3 and 7.

12. The process of claim 11, wherein the pH of the pretreated kaolin is between 5 and 7.

13. The process of claim 1 wherein said first retention agent is a linear or branched homopolymer or copolymer containing up to 55 mole percent of cationic units.

14. The process of claim 13, wherein said first retention agent contains up to approximately 30 mole percent of cationic units.

15. The process of claim 1, wherein the cationic polymer of high molecular weight is a linear or branched homopolymer or copolymer containing up to 50 to 55 mol % of cationic units, of vinyl monomers optionally copolymerized with monomers of acrylamide (AM) or methacrylamide (MAM) type or chosen from the group including dimethylaminoethyl acrylate (DMAEA), dimethylaminoethyl methacrylate (DMAEMA), which are quaternized or salified, acrylamidopropyltrimethylammonium chloride (APTAC), dimethyldiallyl-ammonium chloride (DADMAC) and methacrylamidopropyltrimethylammonium chloride (MAPTAC).

16. The process of claim 15, wherein said cationic polymer contains up to approximately 30 mol % of cationic units.

* * * * *